Figure 1:
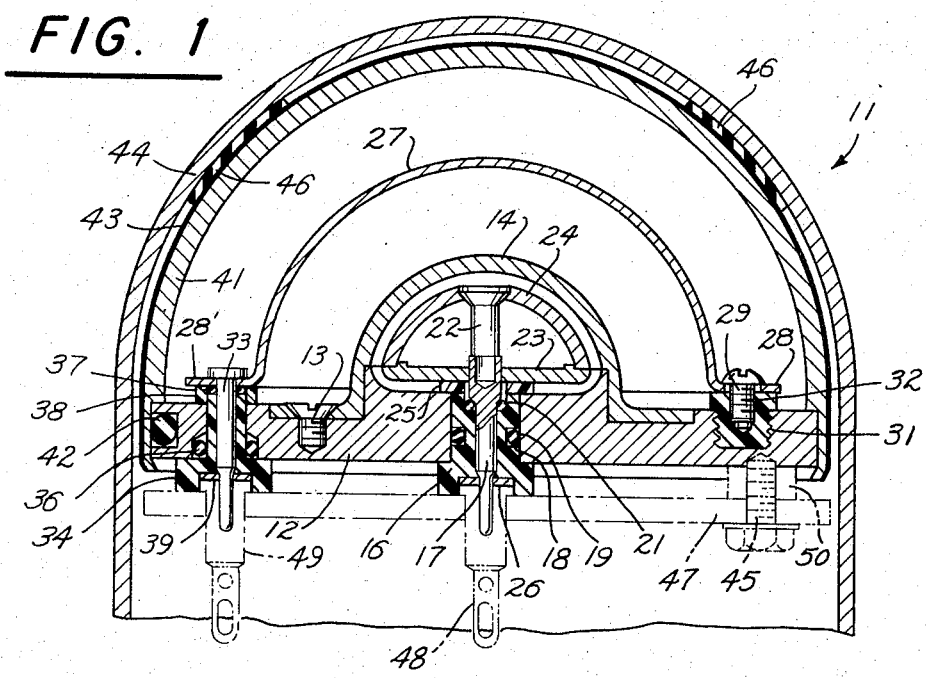

Jan. 30, 1968    H. A. ZAGORITES ET AL    3,366,790
NUCLEAR RADIATION DETECTOR COMPRISING MULTIPLE
IONIZATION CHAMBER WITH HEMISPHERICAL
SHAPED ELECTRODES
Filed March 9, 1964

INVENTORS
HARRY A. ZAGORITES
LAURENCE A. PERRINE
MARKO I. LIPANOVICH

ATTORNEYS

United States Patent Office 3,366,790
Patented Jan. 30, 1968

3,366,790
NUCLEAR RADIATION DETECTOR COMPRISING MULTIPLE IONIZATION CHAMBER WITH HEMISPHERICAL SHAPED ELECTRODES
Harry A. Zagorites, 44 Turquoise Way, San Francisco, Calif. 94131; Laurence A. Perrine, 520 Paloma Ave., Pacifica, Calif. 94044; and Marko I. Lipanovich, 514 Distel Drive, Los Altos, Calif. 94022
Filed Mar. 9, 1964, Ser. No. 350,614
5 Claims. (Cl. 250—83.6)

The invention described herein may be manufactured and used by or for the Government of the United States of America for governmental purposes without the payment of any royalties thereon or therefor.

The present invention relates to ionization chambers used in the detection and measurement of nuclear radiation such as, for example, gamma, beta, X-ray radiation, etc., and more particularly to a unitary multiple ionization chamber consisting of a series of individual radiation detecting sections having discrete outputs and sensitivities.

Penetrating radiation is commonly detected and measured through the use of the ionization chamber detector. The ionization chamber is well known and consists of a gas or combination of gases bounded by equipotential surfaces of opposite polarity. Incident radiation ionizes the gas in proportion to the radiation intensity and, when the proper surface materials, surface geometries, potentials, gases and gas pressures are employed, the ionization chamber is generally employed in such a manner that a current output is derived from the collection of the disassociated gas molecules (ions) which is proportional to the measured radiation. Each detector has a discrete sensititvity and a single output which is useful over a prescribed range of radiation intensity for each condition of operation, characterized by bias potential, gas fill, etc. In addition, the intensity range of the measurement may be further limited by the dynamic range of the electrical or electronic device(s) which receives and displays the ionization chamber output. Therefore, a nuclear radiation measurment over a wide range of intensity may require a multiplicity of ionization chambers, a multiplicity of electrical or electronic devices, switching and control circuitry, or a combination of these.

When a multiplicity of ionization chambers is required, say, for example, to measure nuclear radiation over a wide range of intensity, generally, cost is increased, reliability is reduced, and the size of the measuring system must be increased to accommodate additional chambers. Further, the response of an individual ionization chamber may be perturbated by the proximity of additional ionization chambers, since the chambers will shadow or shield each other in a manner which will vary with the direction and energy of the incident radiation. Also, when it has been necessary to employ a group of plural individual chambers for the radiation mesurement at hand, the effective center of each individual chamber representing the effective point of measurement will be displaced from the effective center of each other chamber, so that the effective point of measurement with such a group of plural individual chambers will vary depending upon the particular chamber or chambers in use. For these reasons the calibration of such plural ionization chamber groups for the measurement of non-isotropic (i.e., the intensity of the given field is not the same in every direction) radiation fields is often difficult or virtually impossible in practice.

The present invention provides a means for detecting and measuring radiation over a wide range of intensity which provides significant advantages over the groups of individual and separate ionization chambers previously employed for that purpose. The multiple ionization chamber of this invention comprises a series of individual sections, each of which has a discrete output and sensitivity range. Each section of the chamber functions independently of the other sections therein, but the sections are arranged so that each section encompasses all sections of smaller dimensions and in a manner which allows the outer-bounding surface of a smaller section to be common with the inner-bounding surface of the next larger section. The invention has the advantages of providing multiple chambers in minimum volume and with a minimum of parts, therefore minimizing fabrication and installation costs. Other significant advantages are improved directional response and the attainment of a common effective center and/or axis of measurement for this multiple ionization chamber. With the individual radiation-detection sections of this multiple ionization chamber so arranged that each section encompasses all sections of smaller dimensions, each of the chamber sections will have a substantially equal response to radiation over a solid angle of $4\pi$ steradians or some other solid angle of interest by providing a uniform and symmetrical structure over this angle. Moreover, in this ionization chamber of the invention the effective centers of measurement for the various operative chamber sections are coincident and/or coaxial, thus assuring a common effective center or point of measurement of the multiple chamber assembly.

Among objects of importance of the present invention are the following:

To provide an ionization chamber adapted to detect and measure nuclear radiation over a wide range of intensity.

To provide an ionization chamber capable of detecting and measuring nuclear radiation over a wide range of intensity which requires a minimum volume and a minimum of parts.

To provide an ionization chamber which is capable of detecting and measuring nuclear radiation over a wide range of intensity and which achieves a common effective center and/or axis of measurement.

To provide an ionization chamber capable of detecting and measuring radiation over a wide range of intensity and which is easily calibratable.

To provide an ionization chamber which is capable of detecting and measuring radiation over a wide range of intensity and which is characterized by improved directional response.

Figure 2:
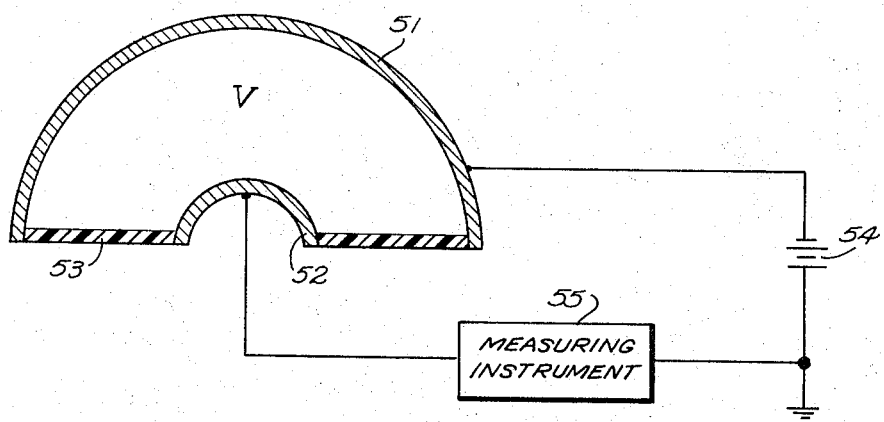

Other objects and many of the attendant advantages of this invention will be readily appreciated as the same becomes better understood by reference to the following detailed description when considered in conjunction with the accompanying drawing in which:

FIG. 1 is an elevational view, in section, of a typical embodiment of the multiple ionization chamber of the invention, this particular embodiment portraying a two-section chamber; and FIG. 2 is a simplified ion-chamber fundamental circuit.

Referring now to the drawing, the two-section multiple ionization chamber portrayed therein typifies the invention and is generally designated by the numeral 11. The multiple ionization chamber of the invention can consist of any given number of radiation-detecting sections; an understanding of the structure portrayed in FIG. 1 will convey how a multiple ionization chamber of any given number of radiation-detecting sections can be made.

Fixedly secured to an aluminum chamber base 12 by a series of annularly-disposed machine screws 13 is a substantially-hemispherically-shaped high-range positive collector electrode 14 (of aluminum). Chamber base 12 is centrally bored and receives therein, in an interference fit, a bushing 16, of Teflon, which is also centrally bored to receive therein, in an interference fit, a feed-through pin 17, of stainless steel. Bushing 16 is formed with an annular recess 18 which receives a rubber O-ring 19, this O-ring 19 serving to form a gas-tight seal between bushing 16 and chamber base 12. In like manner rubber O-ring 21 forms a gas-tight seal between bushing 16 and feed-through pin 17. At its upper end feed-through pin 17 is formed with a bore which receives in an interference fit a fastener element 22. Journaled onto the upper portion of feed-through pin 17 for support thereby is a collector base plate 23 (of aluminum). This collector base plate 23 serves to support the hemispherically-shaped high-range negative collector electrode 24 which is formed at its uppermost portion with an opening which accommodates the head of fastener element 22. With fastener element 22 fitted into the upper portion of feed-through pin 17 after high-range negative collector electrode 24 has been placed upon its base plate 23, fastener element 22 securely holds high-range negative collector electrode in operative position. Intermediate chamber base 12 and collector base plate 23 is an annular spacer 25 which serves to give mechanical support to collector base plate 23 and, being of Teflon, or the like, it maintains electrical insulation between chamber base 12 and collector base plate 23. At its lower portion, feed-through pin 17 is surrounded by and firmly held in place by a metal retaining disc 26. Substantially-hemispherically-shaped low-range negative collector electrode 27 is formed with a series of peripherally-disposed tab extensions 28, each of which is secured in a manner to be described to chamber base 12 for the purpose of holding the low-range negative collector electrode 27 in its operative position. Most of these tab extensions 28 of low-range negative collector electrode 27 are directly held in fixed position by respective metal screws 29. However, because it is required that low-range negative collector electrode 27 be maintained out of electrical contact with chamber base 12, an intermediate insulating stand-off member 31, made of Teflon or the like, is employed with each screw 29. Stand-off member 31 has a threaded bore 32 which mates with the threaded shank of metal screw 29 and, in turn, stand-off member 31 is externally threaded at its lower portion to mate with a complementarily threaded bore therefor in chamber base 12. With metal screw 29 threaded into stand-off member 31 and stand-off member 31 threaded into chamber base 12, low-range negative collector electrode 27 will be held firmly in place by the plurality of machine screws 29 and stand-off members associated with the various tab extensions 28 of this low-range negative collector electrode 27. At one of its tab extensions 28' low-range negative collector electrode 27 makes contact with a metal feed-through pin 33. At its head end metal feed-through pin 33 is in firm contact with low-range negative collector electrode 27 and the longitudinal shaft of feed-through pin 33 passes (in an interference fit) through a bore in the Teflon bushing 34, which, in turn, is pressed into a bore (by way of interference fit) in the chamber base 12. O-rings 36 and 37 respectively function to produce a gas seal between chamber base 12 and bushing 34, on the one hand, and between feed-through pin 33 and bushing 34, on the other. Insulating spacer 38, of Teflon or the like, is positioned between chamber base 12 and that tab extension 28' of low-range negative collector electrode 27 which contacts feed-through pin 33 for the purpose of electrically insulating base 12 from tab 28'. Surrounding the lower portion of feed-through pin 33 is a metal retaining disc 39 for maintaining the feed-through pin 33 in proper orientation position.

A low-range positive collector electrode 41 is positioned outwardly of the low-range negative collector electrode 27 and, made of aluminum, is substantially hemispherical in shape. This low-range positive collector electrode 41 is crimped at its lower position around chamber base 12 so as to be held in fixed position thereby. O-ring 42 forms a gas-tight seal between this low range positive collector electrode 41 and chamber base 12. In covering position over the entire top surface of the hemispherically shaped low-range positive collector electrode 41 is a lead sheet 43 which conforms to the outer shape of low-range positive collector electrode 41 and which performs a filtering function to be described later herein.

The multiple ionization chamber assembly can be housed within an outer shell 44 which fits in an encompassing position around the operative multiple ionization chamber assembly and which can be formed of metal such as aluminum. When this outer shell 44 is employed, a number of cushioning pads 46, formed of a material such as neoprene or the like, are positioned intermediate this outer shell 44 and the low-range positive collector electrode 41. These cushioning pads 46, which are glued in place, provide clearance between the multiple ionization chamber assembly and the outer shell 44 and produce both a cushioning and an appropriate separation between these elements.

The multiple ionization chamber 11 defined herein may be housed in a single unit with associated switching and control circuitry and, for this unit, outer shell 44 can serve as the primary housing member. For this reason the drawing shows outer shell 44 extending below the lower limits of the multiple ionization chamber 11. There is shown in the drawing, in phantom lines, an electrometer plate 47 upon which the bushings 16 and 34 can be supported in such an integrally housed unit. The chamber 11 is secured to plate 47 by means of machine screw 45 in combination with spacer 50, machine screw 45 interconnecting electrometer plate 47 and the chamber base 12. The respective feed-through pins 17 and 33 represent the signal output pins of the respective high-range and low-range sections of the multiple ionization chamber 11 and, as output pins, these feed-through pins 17 and 33 will respectively mate with suitably insulated output jacks 48 and 49 which also are shown in phantom and which are retained by electrometer plate 47.

The operative high-range radiation-detecting section of multiple ionization chamber 11 consists of the volume encompassed by the inner surfaces of chamber base 12 and high-range positive collector electrode 14 and the outer surfaces of high-range negative collector electrode 24, collector base plate 23, spacer 25, and fastener element 22. High-range negative collector electrode 24, collector base plate 23, and fastener element 22, acting as the collector of electrons are made positive with respect to chamber base 12 and high-range positive collector electrode 14 through the contact of feed-through pin 17. Spacer 25 and bushing 16 are insulators of sufficient resistivity to make insulator leakage currents negligible relative to the high-range radiation detection section output current at the smallest intensity to be measured by this high-range radiation detecting section of multiple ionization chamber 11.

The low-range radiation-detecting section of multiple ionization chamber 11 is located outwardly of the high-range radiation-detecting section and consists of the volume encompassed by the inner surfaces of chamber base 12 and low-range positive collector electrode 41 and the outer surface of high-range positive collector electrode 14. Low-range negative collector electrode 27, acting as the collector of electrons, is made positive with respect to chamber base 12 and low-range positive collector electrode 41 through the contact of feed-through pin 33. Spacer 38 and bushing 34 are insulators of sufficient resistivity to make insulator leakage currents negligible relative to this low-range radiation-detecting section output current at the smallest intensity to be measured by this low-range radiation-detecting section.

Each of the operative radiation-detecting sections of this multiple ionization chamber 11 can have, as a gas fill, any of the gases conventionally employed for this purpose, including, among others, pure air, nitrogen and inert gases such as argon, neon, etc. In the particular embodiment of the multiple ionization chamber portrayed in the drawing, pure air was employed as the gas fill at a pressure of one atmosphere. Achieving this pure air fill is readily accomplished by assembly the various elements of the multiple ionization chamber in a clear air environment. A representative range of intensity covered by the representative chamber embodiment displayed herein is 0–$10^7$ roentgens per hour, with the low-range radiation-detecting section output being useful from 0–$14^4$ roentgens per hour and the high-range radiation-detecting section output being most useful from $10^3$–$10^7$ roentgens per hour. The sensitivity of the low-range radiation-detecting section is about 100 times that of the high-range radiation-detecting section.

Although in the embodiment portrayed by the drawing the discrete radiation-detecting sections of the multiple ionization chamber 11 are shown as being defined by hemispherically-shaped electrode structure, these radiation-detecting sections of the multiple ionization chamber of the invention can be cylindrical, spherical, cubic or of any other geometric shape or combination of these shapes. The structural criterion which must be met is that the various radiation-detecting sections of the multiple ionization chamber embodiment have a common effective center and/or axis of radiation measurement. Put into somewhat different terms, the criterion being met in the multiple ionization chamber herein is that the respective centers of sensitive volume of the individual radiation-detecting sections of the chamber be located on a common axis and that each larger-size radiation-detecting section at least in part encompass each smaller-size radiation-detecting section and preferably encompass same completely. The materials used in constructing the radiation-detecting sections of the chamber can be of any conducting element(s) and/or any of a large number of plastics, such as Lucite, polyethylene, and the like, with appropriate conductive coatings applied thereto. In the particular embodiment portrayed in FIG. 1 an especially rugged chamber was desired and for this reason aluminum was cited as the primary construction material employed in the various radiation-detecting sections of the chamber. As previously stated, the gas fill of each of the discrete, individual radiation-detecting sections of the chamber can be any gas conventionally used for this purpose, this requirement being met by pure air, or any one of a large number of synthetic gases such as Freon, and the like.

As with the conventional ionization chamber, the output of each radiation-detecting section of the multiple ionization chamber 11 is derived through an insulated fitting designed to have electrical leakage which is small relative to the chamber output current. In addition to fluorocarbon materials, such as Teflon, which was specifically cited above, other materials such as polystyrene, ceramic, and the like, can be employed. Potentials are applied to the boundary surfaces and collecting surfaces of each radiation-detecting section (as specifically cited above) in the same manner as is employed in the conventional single-output ionization chamber. Depending on the materials employed in the chamber and the gases and pressures used, a wide variety of assembly and sealing methods can be employed, including welding, soldering, gasketing, etc., or a combination of these methods.

The principles of operation of the various radiation-detecting sections of the multiple ionization chamber 11 of this invention are basically those of the conventional single-output ionization chamber. Each radiation-detecting section is, in fact, a conventional single-output ionization chamber which functions independently. However, the radiation-detecting sections of the chamber are arranged so that each section encompasses all sections of smaller dimensions in a manner which allows the outer bounding surface of a smaller radiation-detecting section to be common with the inner bounding surface of the next-larger radiation-detecting section. The sensitivity and useful range of each radiation-detecting section will depend upon the volume, pressure, and composition of the gas enclosed by the given radiation-detecting section, together with the potentials, geometries, and nature of the bounding surfaces. The number of radiation-detecting sections employed in the multiple ionization chamber of the invention will be determined by the performance requirement being met. In theory, the number of discrete radiation-detecting sections (with their individual discrete outputs) is unlimited. With the common effective center and/or axis of measurement for these various individual discrete-output radiation-detecting sections, an optimized directional response will be achieved which is absent the perturbation difficulties previously noted as an incident of the use of the aforedescribed groups of individual ionization chambers for accomplishing the same ends.

FIG. 2 portrays, in simplified schematic form, the fundamental circuit involved in the use of each of the radiation-detecting sections of the ionization chamber 11 of the invention. In this FIG. 2 schematic, positive-ion collector 51 corresponds to the positive collector electrodes 14 and 41 of the respective high and low-range detecting chamber sections seen in FIG. 1 and negative-ion collector 52 to the negative collector electrodes 24 and 27 of these radiation-detecting sections. The positive-ion collector 51 and negative-ion collector 52 are separated by an insulator 53 which together with positive-ion collector 51 and negative-ion collector 52 defines the "sensitive volume" V in which is located the gas fill which is ionizable by incident radiation. Neutral atoms of the gas in the sensitive volume V are ionized by incident radiation to form "ion-pairs," each of said ion-pairs constituting a positive ion and a negative ion. By establishing appropriate polarity differences between ion collectors 51 and 52 by use of a voltage source 54, ion collector 52 is made positive with respect to ion collector 51 so that collector 52 functions as an electrode to collect the negative ions of the ion-pairs produced by the radiation-derived gas ionization in sensitive volume V and collector 51 functions as an electrode to collect the positive ions of the ion-pairs produced in sensitive volume V. As seen in FIG. 2, the negative-ion collector 52 is connected through a measuring instrument 55 to the positive side of voltage source 54 which, in turn, is referenced to ground. Under the operating conditions of the given radiation-detecting section, the number of positive ions entering positive-ion collector 51 is equal to the number of negative ions entering negative-ion collector 52. As an operating condition for the radiation-detecting section, the voltage difference applied between positive-ion collector 51 and negative-ion collector 52 is of a level sufficient to prevent "recombination" of positive and negative ions before they reach their respective collectors. Each of the collectors 51 and 52, as it collects its respective ions, undergoes a change in its charge or potential. This change in potential of the respective ion collectors will give an electrical indication in a measuring instrument 55 externally connected in circuit with these ion collectors. The electrical indications reflected by measuring instrument 55 will indicate the ionizing events taking place in the sensitive volume V which in turn are a measure of the intensity of detected radiation received by the given radiation-detecting section. Depending upon whether the electrical capacitance of the given radiation-detecting section and the over-all electrical capacitance of the associated electronic circuit is large or small, the given radiation-detecting section may be used either as a "counting-type" or as an "integrating-type" ionization chamber. This is merely a matter of choice and can be controlled by the parameters indicated above. When the "counting" method is employed, generally individual electrical pulses due to the individual ionizing events are separately detected and measured. In an alternative "counting" method the electrical pulses due to the individual ionizing events are averaged and measured in an ammeter (serving as measuring instrument 55). In the "integration" method, the change in ion-collector potential over a period of time is the quantity being measured and this will reflect the accumulative radiation-induced ionization experienced in the radiation-detecting section over the time period involved. In that "counting" method technique wherein the individual electrical pulses derived from the individual ionizing events are separately detected and measured, a high-gain amplifier and pulse counter are generally employed. In the alternative "counting" method technique wherein the ionizing events are averaged and measured by an ammeter, a high-impedance current amplifier (electrometer) is employed. In the "integration" method a high-impedance voltmeter is employed.

The invention embodiment set out in specifics above is most applicable to the detection of gamma or X-ray radiation. As applied to alpha-particle and beta-particle detection, very light materials would have to be substituted in the chamber. For neutron measurement use, certain appropriate coatings would have to be applied to the inside of the structure of the ionization chamber and/or special gas fills specific to neutron measurement utilized within the chamber.

One point requiring further explanation is the use of lead sheet 43 to correct the energy response of both the high-range and the low-range radiation-detecting sections of the multiple ionization chamber 11 over a portion of the gamma energy spectrum. When the subject ionization chamber is employed for detecting the characteristics of such things as fall-out, for example, gamma photons will be involved which have a wide range of different energy levels. It is a necessary requirement of the multiple ionization chamber 11 to be uniform in its response to this gamma radiation over this range of energies. As incident radiation impinges upon a radiation-detecting ionization chamber or, as in the given instance, upon a discrete radiation-detecting section of the multiple ionization chamber 11, "secondary" electrons are produced in the walls of the ionization chamber or radiation-detecting section of a multiple ionization chamber as a result of interaction between photons of the incident radiation with the wall material. These secondary electrons are emitted from the wall material and contribute to the radiation measurement results indicated at the output of the given ionization chamber or radiation-detecting section of a multiple ionization chamber. This production of secondary electrons (at a given radiation intensity) is not uniform over the various photon energy levels that will be encountered by the given chamber or radiation-detecting section. At lower photon energy levels this production of secondary electrons is substantially more efficient than at higher photon energy levels, with the result that radiation received at the lower photon energy levels produces an effect in the given ionization chamber or radiation-detecting section that is out of proportion to the intensity (as measured by an air-equivalent chamber) of the radiation received at the lower photon energy levels. Accordingly, in order to achieve a flat response within a given ionization chamber or radiation-detecting section over the full range of anticipatable photon energy levels to be encountered, a radiation filtering element such as lead sheet 43 is employed. This lead sheet 43 achieves the flat response for its chamber by attenuating the incident radiation at the lower photon energy levels proportionately more than the incident radiation at the higher photon energy levels. This discriminatory action against the impinging gamma radiation of the lower photon energy levels compensates for the higher secondary electron production resulting therefrom. The overall net effect is a substantially flat, uniform response of the given ionization chamber or radiation-detecting section over the full range of radiation photon energy levels to be encountered thereby. Here, in the particular embodiment portrayed, the use of lead as the material of the radiation filtering element for attenuating incident radiation of the lower photon energy levels is related to the use of aluminum as the principal structural element in the multiple ionization chamber 11.

Obviously many modifications and variations of the present invention are possible in the light of the above teaching. It is intended to cover all changes and modifications of the embodiment set forth herein which do not constitute departures from the spirit and scope of the invention.

What is claimed is:

1. A multiple ionization chamber for detection of nuclear radiation over a wide range of intensities comprising:
   a central electrode of the hemispherical shape;
   a plurality of other electrodes of hemispherical shape concentrically arranged about said central electrode;
   each of said electrodes being spaced from adjacent electrodes to form gas chambers between said adjacent electrodes;
   each of said electrodes being constructed of a material which passes the radiation to be detected over a wide band of energies with substantially no absorbtion of said energies;
   a gas fill occupying the spaces between adjacent electrodes;
   said gas fill being ionizable by nuclear radiation to be detected;
   means for providing an electrical potential difference across adjacent electrodes; and
   means for detecting the potential differences across said adjacent electrodes.

2. The apparatus of claim 1 wherein said electrodes are constructed of aluminum.

3. A multiple ionization chamber for detection of nuclear radiation over a wide range of intensities comprising:
   a flat circular-shaped conductive base plate;
   a first conductive electrode positioned above the center of said base plate and insulated therefrom;
   said first electrode being of hemispherical shape;
   $n$ hemispherical electrodes of increasing diameters concentrically arranged about said first electrode where $n$ equals any whole number larger than one;
   each of said electrodes being spaced from adjacent electrodes; and
   each of said electrodes having its open side oriented towards said base plate and fastened in sealed relation to said base plate;
   alternate ones of said electrodes being electrically connected to said base and the remaining ones of said electrodes being electrically insulated therefrom;
   a plurality of electrical terminals extending through said base;
   each of said terminals being connected to a respective one of said insulated electrodes;
   a volume of gas, capable of being ionized by nuclear radiation, disposed in each of the spaces between adjacent electrodes;
   each of said electrodes being constructed of a material which passes the radiation to be detected over a wide band of energies with substantially no absorbtion of said energies; and
   means for applying electrical potential differences between said base and each of said terminals.

4. The apparatus of claim 3 further including a hemispherical radiation filtering means disposed about the exterior of the outermost electrode for selectively attenuating the nuclear radiation incident upon said chamber for ensuring a substantially flat uniform response by said ionization chamber over the full range of energy levels of incident radiation.

5. The apparatus of claim 4 wherein said electrodes are aluminum and said filtering means is lead.

References Cited

UNITED STATES PATENTS

| | | | |
|---|---|---|---|
| 2,445,305 | 7/1948 | Hochgesang | 250—83.6 |
| 2,479,271 | 8/1949 | Shonka | 250—83.6 |
| 2,756,348 | 7/1956 | Schneider | 250—83.6 |
| 3,019,339 | 1/1962 | Wesley | 250—83.6 |
| 3,197,637 | 7/1965 | Kronenberg | 250—83.1 |

ARCHIE R. BORCHELT, *Primary Examiner.*

RALPH G. NILSON, *Examiner.*